US005477598A

United States Patent [19]

Borner, Jr.

[11] Patent Number: 5,477,598

[45] Date of Patent: Dec. 26, 1995

[54] CAP AND SPRING INSTALLATION AND REMOVAL TOOL

[76] Inventor: John B. Borner, Jr., 2942 Sabal Palm Dr., Edgewater, Fla. 32141

[21] Appl. No.: 192,360

[22] Filed: Feb. 7, 1994

[51] Int. Cl.$^6$ .......... B23P 19/04

[52] U.S. Cl. .......... 29/227; 254/10.5

[58] Field of Search .......... 81/55, 13, 451; 29/227, 240; 254/10.5

[56] References Cited

FOREIGN PATENT DOCUMENTS

| | | | |
|---|---|---|---|
| 401769 | 8/1909 | France | 81/13 |
| 2230670 | 1/1974 | Germany | 81/13 |

*Primary Examiner*—Robert C. Watson

*Attorney, Agent, or Firm*—William M. Hobby, III

[57] ABSTRACT

A cap and spring installation and removal tool apparatus is provided for installing and removing a motorcycle spring on motorcycle front forks. The tool includes a frame having a yoke attached to the frame for engaging a motorcycle front fork spring housing and a threaded shaft threaded through a portion of the frame for compressing and expanding a spring in a motorcycle spring housing and having an axial bore extending therethrough and a handle on one end portion thereof. A rotatably mounted shaft is rotatably mounted through the bore in the threaded shaft and has a handle on one end and a spring tube cap engaging member, such as a hex head, on the other end thereof so that the rotatably mounted shaft can be rotated to remove or attach the spring tube cap while the threaded shaft is rotated to compress or release spring in the spring housing for removing and reinstalling the motorcycle front fork spring.

4 Claims, 1 Drawing Sheet

CAP AND SPRING INSTALLATION AND REMOVAL TOOL

BACKGROUND OF THE INVENTION

The present invention relates to a motorcycle front fork spring and spring cap installation and removal tool for installing and removing a motorcycle spring within the motorcycle spring housing.

Many motorcycles require that the front fork springs be removed in order to change the hydraulic fluid after which the spring must be reinstalled. This operation is difficult because the springs are compressed within a spring housing and locked in place with a cap over, the housing. In order to remove the springs when replacing the hydraulic fluid in the spring housing, or to replace a spring or leaking seal, requires that the cap be removed by threading the cap from the housing. The cap typically has a hex head opening for inserting a hex head wrench for removing the cap. However, once the cap comes loose from the housing, the compressed spring can cause injury upon being released. In addition, to reinstall the spring in the front fork housing requires that the spring be placed in the housing and the cap on top of the spring and the spring forced into the housing while the cap is being rotated to threadedly reattach the cap to lock the spring in the fork spring housing. In the past, this has been a difficult maintenance operation and has resulted in injuries during the release or compressing of the spring within the fork spring housing.

The present invention is directed towards safely removing the fork spring and fork spring retainer cap from the fork spring housing and for reinstalling the fork spring in the fork spring housing and the fork spring retainer cap after the hydraulic fluid has been changed within the fork spring housing.

Prior art patents which compress and release springs of various types may be seen in U.S. Pat. No. 3,571,884 for a sheave flange opening device which is a screw operated mechanism for mounting and removing a sheave on compression of a spring. In the Corrigan U.S. Pat. No. 4,088,377, a recoil spring lock device for a tracked vehicle is provided. In the Vogt U.S. Pat. No. 1,087,337, a valve clamp for clamping engine valves has a locking mechanism in a threaded shaft operated from a handle for closing the valve in a bore or the like. In the Papapetros U.S. Pat. No. 4,872,644, a motor vehicle servicing tool is provided for compressing a coil spring of the vehicle suspension strut and includes a threaded shaft rotated with a handle for compressing a spring. In the Pace U.S. Pat. No. 3,070,354, a coil spring compressor uses a threaded shaft for compressing a spring. The Smyser U.S. Pat. No. 3,278,157, has a spring compressor for a shock absorber.

In contrast to these prior art spring compressors, the present invention is directed towards a cap and spring installation and removal tool for installing and removing a motorcycle fork spring in a motorcycle fork spring housing and thus provides for simultaneous removal of the motorcycle fork spring retainer cap and fork spring and includes engagements for the fork spring retainer cap and the motorcycle spring housing.

SUMMARY OF THE INVENTION

A cap and spring installation and removal tool apparatus is provided for installing and removing a motorcycle spring on motorcycle front forks. The tool includes a frame having a yoke attached to the frame for engaging a motorcycle front fork spring housing and a threaded shaft threaded through a portion of the frame for compressing and expanding a spring in a motorcycle spring housing and having an axial bore extending therethrough and a handle on one end portion thereof. A rotatably mounted shaft is mounted through the bore in the threaded shaft and has a handle on one end and a spring tube cap engaging member, such as a hex head, on the other end thereof so that the rotatably mounted shaft can be rotated to remove or attach the spring tube cap while the threaded shaft is rotated to compress or release the spring in the spring housing for removing and reinstalling the motorcycle front fork spring.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
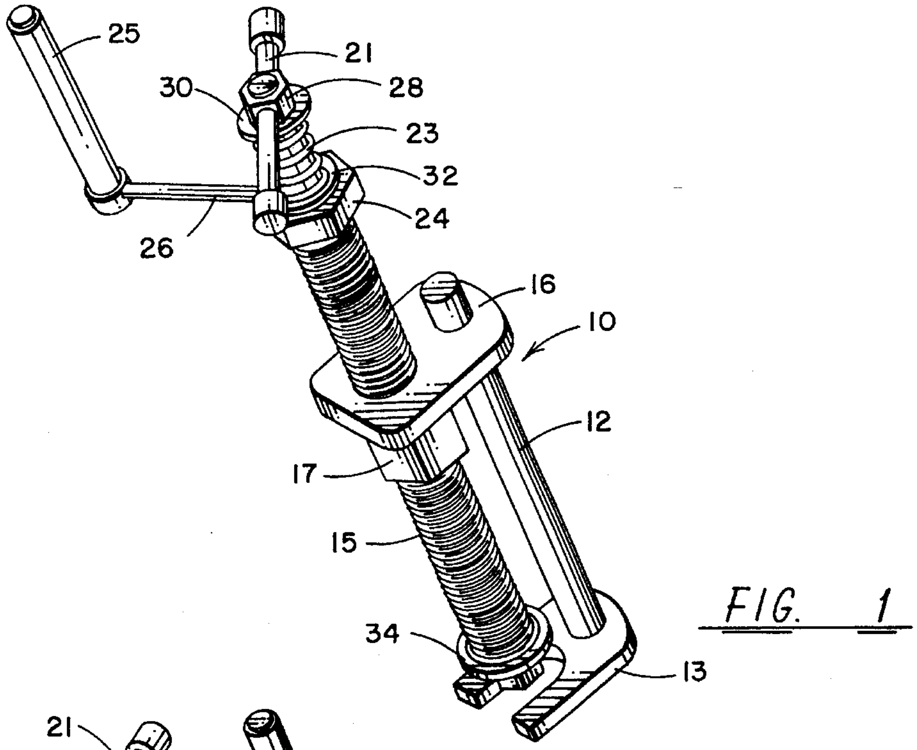
FIG. 1 is a perspective view of a cap and spring installation and removal tool in accordance with the present invention.
Figure 2:
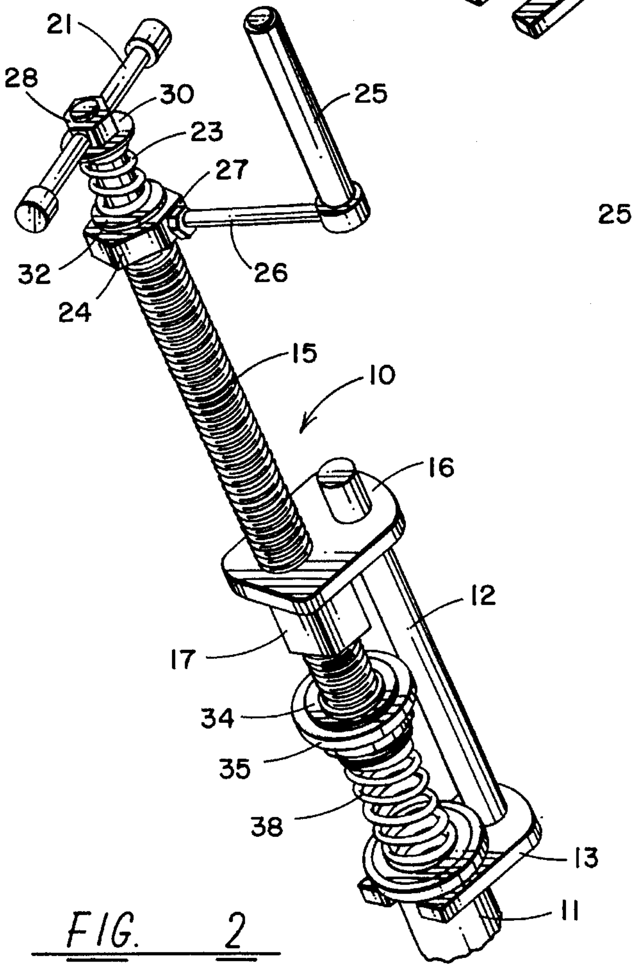
FIG. 2 is a perspective view of the tool of FIG. 1 removing cap and spring from a housing.
Figure 3:
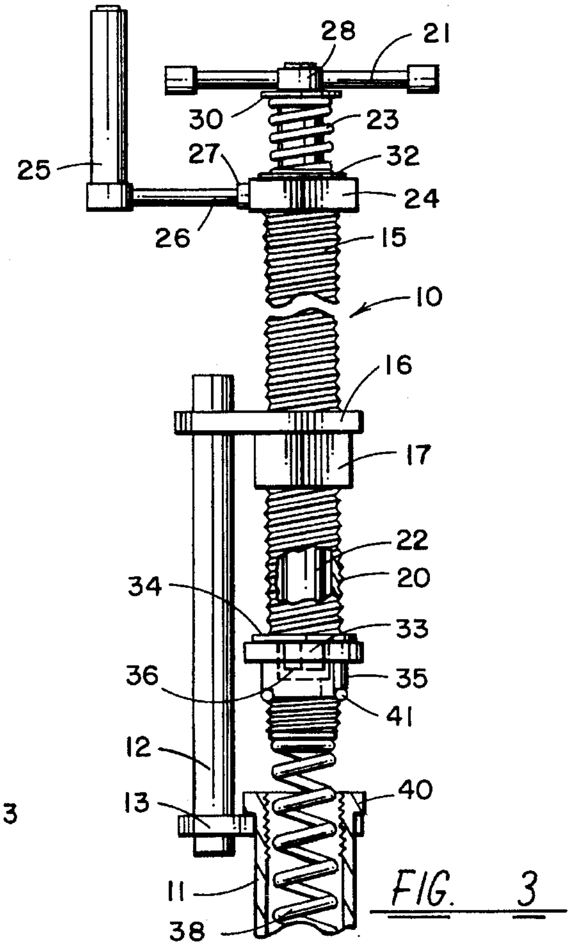
FIG. 3 is a cutaway perspective view of the tool of FIGS. 1 and 2 removing the spring from a spring housing.

Referring to the drawings FIGS. 1–3, a cap and spring installation and removal tool 10 is shown attached to a motorcycle front fork spring housing 11. The tool 10 has a frame portion 12 having a spring housing attaching yoke 13 attached thereto and shown positioned onto the housing 11 under a housing flange 40. A threaded shaft 15 is threaded through a top frame portion 16 which includes a threaded nut portion 17 fixedly attached to the frame portion 16. The threaded shaft 15 has an axially aligned bore 20 extending therethrough and has a rotatable shaft 22 mounted therein. The rotatable shaft in turn has a handle 21 on one end and has a spring 23 attached between the handle 21 on an extended portion of the shaft 22 and supported against a flange portion 24 of the threaded shaft 15, which flange portion has been shaped in a hexagonal edges for engaging a wrench. In addition, the flange portion 24 has a handle portion 25 extending therefrom attached with a handle shaft 26 to a threaded opening 27 in the flange 24. The handle 21 of the shaft 22 has a hex shaped portion 28 having a threaded center for threading onto the end of the shaft 22 and has a washer 30 for supporting the spring 23 against one end and a slip washer 32 for supporting the spring 23 on the other end thereof. Shaft 22 has a hex head or cap removing member 33 attached to the other end thereof from the handle 21 which includes a washer 34 supporting the hex head 33 rotatably in the bore 20 in the threaded shaft 15. Thus, rotation of the handle 21 rotates the shaft 22 within the bore 20 of threaded shaft 15 to rotate the cap removal portion 33.

The tool can be attached to the spring housing 11 with the yoke 13 and threaded with the handle 25 to thread the shaft 15 to the desired position. The shaft 22, by pushing on handle 22, can then be pushed linearly through the bore 20 to engage the cap removing hex 33 into the motorcycle fork spring housing cap 35 hex opening 36. The handle 21 can then be rotated to rotate the shaft 22 and the cap 35 which is threadedly attached with threads to the housing 11. As the cap 35 is rotated to remove the cap, the motorcycle front fork spring 38, which is compressed in the housing 11, pushes against the cap 35 until the cap 35 is removed from the housing at which time the cap is supported against the spring 38 pressure by the end of the threaded shaft 15. The handle 25 can be continuously rotated until the pressure is relived from the spring 38 and the cap and spring removed from the housing 11.

At this point, the hydraulic fluid in the motorcycle front fork spring housing 11 can be removed and replaced and the spring 38 reinserted into the housing 11 and the cap 35 placed thereon and a tool 10 attached, as shown in FIG. 3. The handle 25 can be rotated to drive the cap 35 against the spring 28 to compress the spring back into the housing 11. When the cap 35 reaches the housing 11 adjacent the internal threads of the housing 11, the handle 21 can be rotated to rotate the shaft 22 in cap engaging portions 33 to rotate the cap 35 to threadedly seal the housing 11 with the compressed spring 38 thereinside. The cap 35 has an O-ring seal 41 for sealing the hydraulic fluid within the housing 11. The handle 21 can be removed from the shaft 22 if desired to allow the shaft 22 to slide out and be replaced with a different shaft 22 having a different size or shaped cap removing and engaging portion 33 to fit a different motorcycle which might have a different front fork spring housing cap 35 so that the tool can be used with a wide variety of motorcycles having front forked springs mounted in fork spring housings.

It should be clear at this point that a cap and spring installation and removal tool for installing and removing a motorcycle spring has been illustrated. However, it should also be clear that the present invention should not be construed as limited to the forms shown which are to be considered illustrative rather than restrictive.

I claim:

1. A cap and spring installation and removal tool for installing and removing a motorcycle spring in a spring tube comprising:

a frame;

a spring tube engagement member attached to said frame for engaging a motorcycle spring tube, said spring tube engagement member having a yoke formed thereon;

a threaded shaft threaded through a portion of said frame for compressing and expanding a spring in a motorcycle spring tube, said threaded shaft having an axially bore therethrough and having a turning handle on one end thereof; and a rotatably mounted shaft rotatably mounted through said bore in said threaded shaft, said rotatably mounted shaft having a handle on one end thereof for rotating said rotatably mounted shaft therewith and a spring tube cap engaging member on the other end thereof; whereby said rotatably mounted shaft can be rotated to remove or attach said spring tube cap and said threaded shaft can be rotated to compress or release said spring in a spring tube for removing or installing a motorcycle spring.

2. A cap and spring installation and removal tool for installing and removing a motorcycle spring in a spring tube in accordance with claim 1 in which spring tube cap engaging member is a hex head engaging member.

3. A cap and spring installation and removal tool for installing and removing a motorcycle spring in a spring tube in accordance with claim 1 in which rotatably mounted shaft has a spring mounted between said threaded shaft and said rotatably mounted shaft handle.

4. A cap and spring installation and removal tool for installing and removing a motorcycle spring in a spring tube in accordance with claim 3 in which spring tube cap engaging member is interchangeable for different spring tube caps.

* * * * *